United States Patent
Okamoto

(10) Patent No.: US 7,202,971 B2
(45) Date of Patent: Apr. 10, 2007

(54) COLOR PROCESSING METHOD, COLOR PROCESSING APPARATUS, AND COLOR PROCESSING PROGRAM STORAGE MEDIUM

(75) Inventor: Takahiro Okamoto, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 827 days.

(21) Appl. No.: 09/898,058

(22) Filed: Jul. 5, 2001

(65) Prior Publication Data
US 2002/0018225 A1 Feb. 14, 2002

(30) Foreign Application Priority Data
Jul. 11, 2000 (JP) .............................. 2000-209449

(51) Int. Cl.
*H04N 1/60* (2006.01)
(52) U.S. Cl. ...................... 358/1.9; 358/518; 382/167
(58) Field of Classification Search ................ 358/500, 358/523, 537, 504, 509, 1.9, 518–520; 382/167, 382/162
See application file for complete search history.

(56) References Cited

U.S. PATENT DOCUMENTS

| | | | | |
|---|---|---|---|---|
| 5,425,134 A | * | 6/1995 | Ishida ......................... | 358/1.9 |
| 5,631,749 A | * | 5/1997 | Ueda ........................... | 358/520 |
| 5,777,623 A | * | 7/1998 | Small ........................... | 345/586 |
| 5,828,780 A | * | 10/1998 | Suzuki et al. ............... | 382/167 |
| 6,002,806 A | | 12/1999 | Morikawa ................... | 382/274 |
| 6,118,455 A | * | 9/2000 | Hidaka et al. ............... | 345/589 |
| 6,130,675 A | * | 10/2000 | Murai et al. ................ | 345/600 |
| 6,225,974 B1 | * | 5/2001 | Marsden et al. ............ | 345/590 |
| 6,278,533 B1 | * | 8/2001 | Takemoto .................... | 358/521 |
| 6,281,984 B1 | * | 8/2001 | Decker et al. ............... | 358/1.9 |
| 6,320,980 B1 | * | 11/2001 | Hidaka ........................ | 382/167 |
| 6,373,531 B1 | * | 4/2002 | Hidaka et al. .............. | 348/603 |
| 6,668,079 B2 | * | 12/2003 | Takemoto .................... | 382/167 |
| 6,912,306 B1 | * | 6/2005 | Nakabayashi et al. ...... | 382/167 |
| 2001/0013940 A1 | * | 8/2001 | Mayer et al. ................ | 358/1.9 |

FOREIGN PATENT DOCUMENTS

JP 9-83824 3/1997

OTHER PUBLICATIONS

Lindsay W. MacDonald: "Developments in colour management systems", Displays, vol. 16, No. 4, 1996, pp. 203-211.*

* cited by examiner

*Primary Examiner*—Scott A. Rogers
(74) *Attorney, Agent, or Firm*—Sughrue Mion, PLLC

(57) ABSTRACT

A color processing method has a first conversion process for converting on a fixed basis colorimetry data representative of colorimetry values into CMY color data representative of a combination of values of C, M and Y, and a second conversion process for converting the CMY color data obtained in said first conversion process into color data depending on a device.

10 Claims, 9 Drawing Sheets

COLOR PROCESSING METHOD, COLOR PROCESSING APPARATUS, AND COLOR PROCESSING PROGRAM STORAGE MEDIUM

BACKGROUND OF THE INVENTION

1. Field of the Invention

The present invention relates to a color processing method of applying color processing to measured data representative of colorimetry values, for example, XYZ values and L*a*b* values so that a high quality of image can be obtained by, for example a printing system and a printer, a color processing apparatus and a color processing program storage medium storing a color processing program, when executed in a computer, which causes the computer to operate as the color processing apparatus.

2. Description of the Related Art

Hitherto, as an apparatus for applying a high quality of color processing for printing to image data representative of an image, there is known an apparatus in which CMY data representative of a combination of density values of C, M, Y and K is inputted and CMYK data representative of a combination of dot % values of C, M and Y is outputted (cf. for example, Japanese Patent Laid Open Gazette Hei.9-83824, U.S. Pat. No. 6,002,806).

This apparatus is for performing color processing in accordance with an input of CMY data, and is recently improved in various respects. However, such an apparatus is basically established in technology in some extent. There are many experts who are able to perform a high quality of color processing (this type of color processing is referred to as a "set up") through operating the apparatus as mentioned above.

However, recently, as a color management technology becomes popular, there is enhanced a necessity that color data other than CMY data as well is subjected to color processing with high quality. For example, a color management by an ICC profile is spread. In this case, input data to a color processing apparatus is measured data representative of colorimetry values such as XYZ values and L*a*b* values. To use the measured data for printing, there is needed an apparatus for performing a color conversion of the measured data into CMYK data. However, a color processing technology capable of processing such a color conversion of data in high quality is not yet established. Further, to perform a high quality of color processing, technique of an expert is indispensable. However, the expert has no technique of performing a high quality of set up in accordance with colorimetry data, while the expert is skilled in set up based on CMY data through input of the CMY data.

As described above, while necessity for performing a high quality of color processing in accordance with colorimetry data is increased, a processing system for implementing this is not yet established.

SUMMARY OF THE INVENTION

In view of the foregoing, it is an object of the present invention to provide a color processing method capable of performing a high quality of color processing in accordance with colorimetry data, a color processing apparatus and a color processing program storage medium storing a color processing program, when executed in a computer, which causes the computer to operate as the color processing apparatus capable of performing a high quality of color processing in accordance with colorimetry data.

To achieve the above-mentioned object, the present invention provides a color processing method comprising:

a first conversion process for converting on a fixed basis colorimetry data representative of colorimetry values into CMY color data representative of a combination of values of C, M and Y; and a second conversion process for converting the CMY color data obtained in said first conversion process into color data depending on a device.

Here, the above-mentioned "converting on a fixed basis" implies a conversion to be performed on a fixed basis regardless of sorts of images, but not a conversion to be performed adaptively for each image.

In the color processing method according to the present invention as mentioned above, it is preferable that said first conversion process comprises: an RGB data creating process for converting the colorimetry data into RGB data representative of a combination of values of three primary colors R, G and B, and; a CMY data creating process for subjecting the values of three primary colors R, G and B represented by the RGB data obtained in said RGB data creating process to a logarithmic transformation to create CMY data representative of a combination of values of C, M and Y. In this case, it is preferable that the color processing method further comprises a parameter computing process for computing parameters of converting the colorimetry data into the RGB data in accordance with a chromaticity value of a predetermined white point on an x-y chromaticity view and chromaticity values of three points associated with three primary colors R, G and B on the x-y chromaticity view, and said RGB data creating process converts the colorimetry data into the RGB data in accordance with the parameters computed in said parameter computing process. In this case, it is preferable that said parameter computing process provides such a definition that vertexes of a triangle are defined as three points associated with three primary colors R, G and B, said vertexes being located at three straight lines on the x-y chromaticity view, coupling three points, which represent main wave lengths of three primary colors R, G and B in a color reproduction area on the x-y chromaticity view, corresponding to an assembly of entire colors reproducible in a colorimetry system for obtaining the colorimetry data, with a predetermined white point on the x-y chromaticity view, respectively, where said triangle includes the color reproduction area.

Here, in the above-mentioned "colorimetry system", an image before the color processing is recorded. The colorimetry system implies a concept including all having an effect on generation of colorimetry data as an object of color processing, for example, characteristics of image recording medium such as a reversal film, and characteristics of image input apparatuses for reading images and colors from the image recording medium to obtain image data and color data as colorimetry values. In this case, in the event that colorimetry data of sufficiently wide reproduction area can be obtained in view of characteristics of an image input apparatus per se, characteristics of an image recording medium (for example, the color reversal film) on which an image to be converted into colorimetry data by the image input apparatus define a color reproduction area on the x-y chromaticity view.

In the color processing method according to the present invention as mentioned above, as an typical example, said second conversion process converts the CMY color data obtained in said first conversion process into CMYK data representative of a combination of values of C, M, Y and K.

To achieve the above-mentioned object, the present invention provides a color processing apparatus comprising:

a first conversion section for converting on a fixed basis colorimetry data representative of colorimetry values into CMY data representative of a combination of values of C, M and Y; and a second conversion section for converting the CMY color data obtained in said first conversion section into color data depending on a device.

Further, to achieve the above-mentioned object, the present invention provides a color processing program storage medium storing a color processing program which causes a computer to operate as a color processing apparatus, when the color processing program is executed in the computer system, wherein said color processing program storage medium stores the color processing program comprising:

a first conversion section for converting on a fixed basis colorimetry data representative of colorimetry values into CMY data representative of a combination of values of C, M and Y; and a second conversion section for converting the CMY color data obtained in said first conversion section into color data depending on a device.

The color processing apparatus of the present invention includes any types of apparatuses for implementing any types of image processing methods of the present invention. A color processing program, which stores the color processing program storage medium of the present invention, includes any types of programs which causes a computer to operate as an apparatus for implementing any types of image processing methods of the present invention.

DETAILED DESCRIPTION OF PREFERRED EMBODIMENTS

Embodiments of the present invention will be described with reference to the accompanying drawings.

Figure 1:
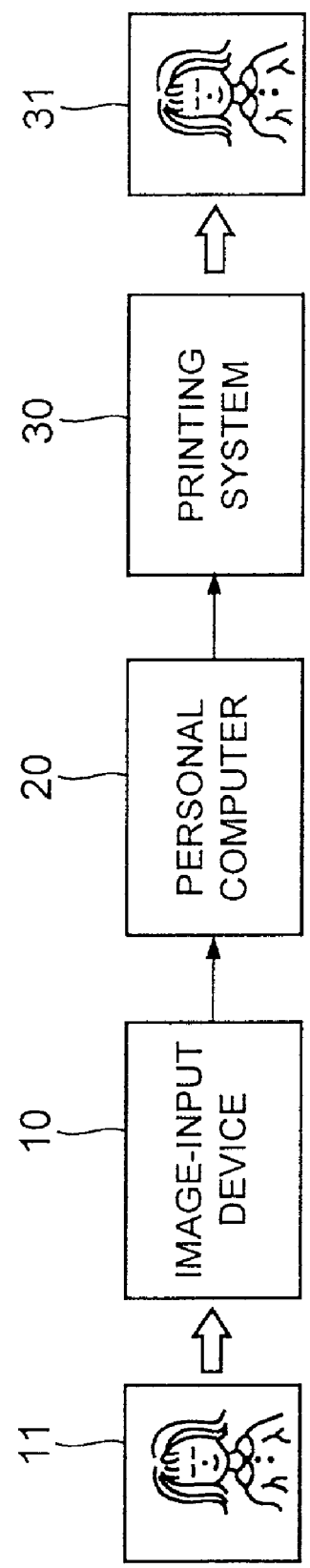
FIG. 1 is a schematic constitution view of an image input-color conversion-image output system to which an embodiment of the present invention is applied.

FIG. 1 is a schematic constitution view of an image input-color conversion-image output system to which an embodiment of the present invention is applied.

An image-input device 10 reads an original image 11 recorded on a reversal film and produces colorimetric image data represented by colorimetry values of XYZ. The colorimetric image data of XYZ produced by the image-input device 10 is fed to a personal computer 20. The personal computer 20 converts the colorimetric image data obtained by the image-input device 10 into image data for printing representative of dot % for CMYK suitable for a printing system 30, which will be described later. The image data for printing is fed to the printing system 30. The printing system 30 performs a printing so that a print image 31 is formed.

An aspect as an embodiment of the present invention in the system shown in FIG. 1 resides in processing contents to be executed inside the personal computer 20. Hereinafter, there will be described the personal computer 20.

Figure 2:
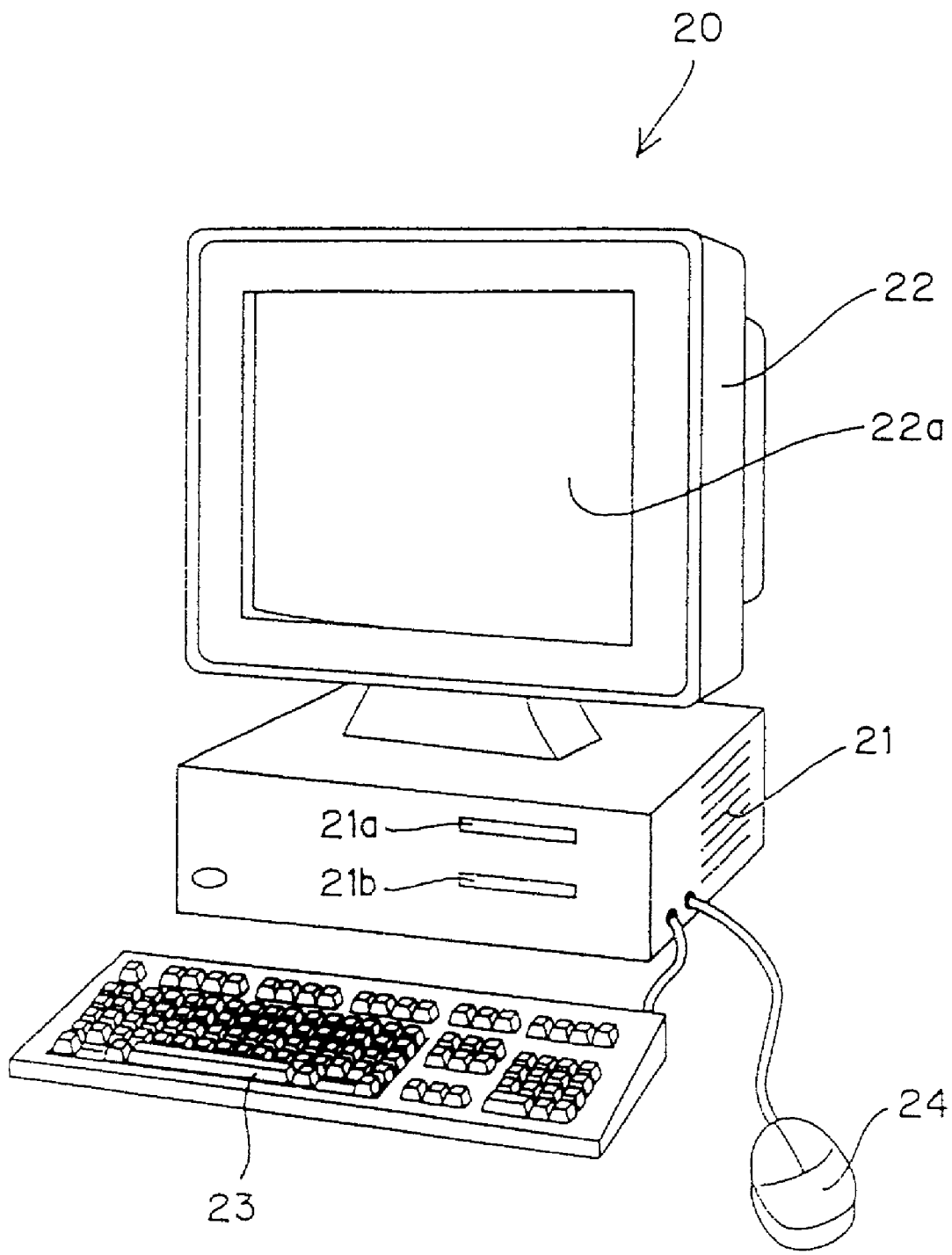
FIG. 2 is a perspective view of a personal computer.
Figure 3:
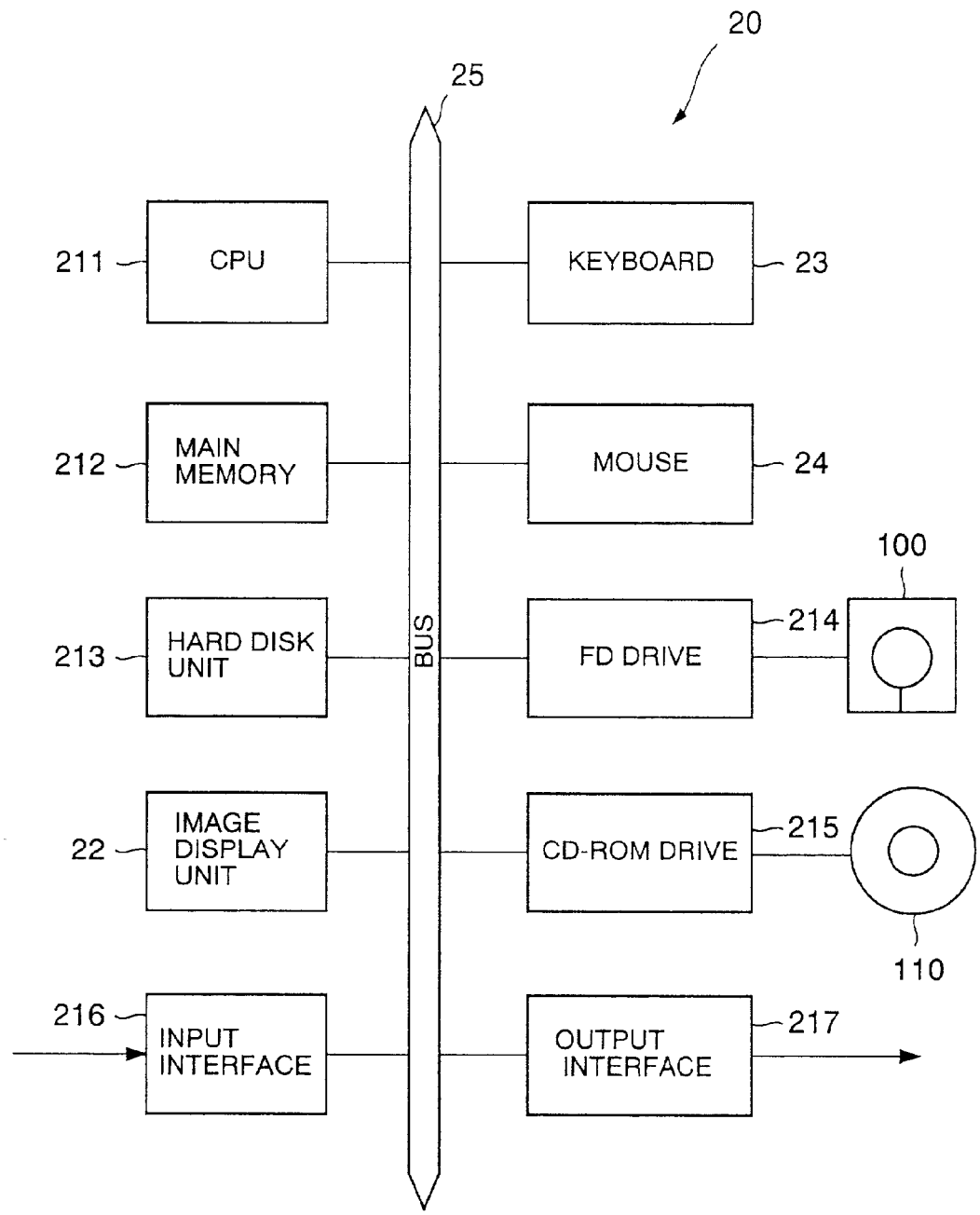
FIG. 3 is a hardware structural view of the personal computer.

FIG. 2 is a perspective view of the personal computer 20 shown in FIG. 1. FIG. 3 is a hardware structural view of the personal computer 20.

The personal computer 20 comprises, on an external appearance, a main frame unit 21, an image display unit 22 for displaying an image on a display screen 22a in accordance with an instruction from the main frame unit 21, a keyboard 23 for inputting various sorts of information to the main frame unit 21 in accordance with a key operation, and a mouse 24 for inputting an instruction according to, for example, an icon and the like, through designation of an optional position on the display screen 22a, the icon and the like being displayed on the position on the display screen 22a. The main frame unit 21 has a floppy disk mounting slot 21a for mounting a floppy disk, and a CD-ROM mounting slot 21b for mounting a CD-ROM.

The main frame unit 21 comprises, as shown in FIG. 3, a CPU 211 for executing a various types of program, a main memory 212 in which a program stored in a hard disk unit 213 is read out and developed for execution by the CPU 211, the hard disk unit 213 for saving various types of programs and data, an FD drive 214 for accessing a floppy disk 100 mounted thereon, a CD-ROM drive 215 for accessing a CD-ROM 110 mounted thereon, an input interface 216 connected to the image-input device 10 (cf. FIG. 1), to receive image data from the image-input device 10, and an output interface 217 to transmit image data to the printing system 30. These various types of elements are connected via a bus 25 to the image display unit 22, the keyboard 23 and the mouse 24.

The CD-ROM 110 stores therein a color processing program for causing the personal computer 20 to operate as a color processing apparatus. The CD-ROM 110 is mounted on the CD-ROM drive 215 so that the color processing program, which is stored in the CD-ROM 110, is up-loaded on the personal computer 20 and is stored in the hard disk unit 213.

Figure 4:
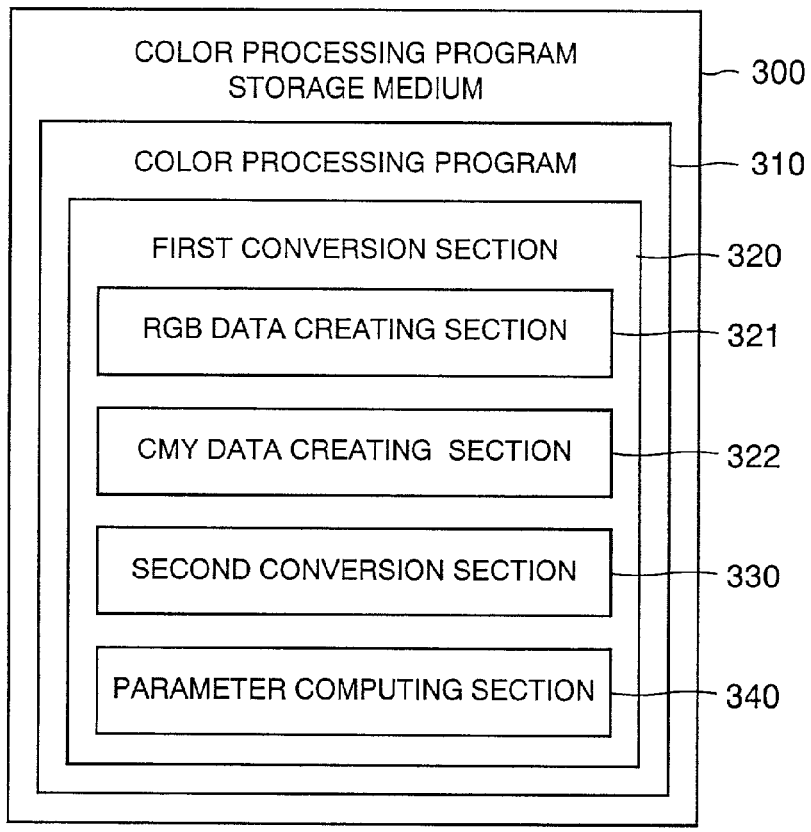
FIG. 4 is a view showing an embodiment of a color processing program storage medium according to the present invention.

FIG. 4 is a view showing an embodiment of a color processing program storage medium according to the present invention. The color processing program storage medium shown in FIG. 4 represents storage medium such as the CD-ROM 110 shown in FIG. 3 and the hard disk in the hard disk unit 213.

A color processing program storage medium 300 stores a color processing program 310 comprising a first conversion section 320, a second conversion section 330 and a parameter computing section 340. The first conversion section 320 comprises an RGB data creating section 321 and a CMY data creating section 322. Operations of the respective sections of the color processing program 310 will be described later.

When the color processing program 310 is stored in the CD-ROM 110 shown in FIG. 3, the CD-ROM 110 corresponds to an example of a color processing program storage medium of the present invention, and when the color program 310 stored in the CD-ROM 110 is loaded onto the personal computer 20 and stored in the hard disk unit 213, the hard disk storing the color processing program 310 corresponds to an example of a color program storage medium of the present invention. Further, when the color processing program 310 within the hard disk is down loaded onto the floppy disk 100 shown in FIG. 3, the floppy disk storing the color processing program 310 also corresponds to an example of a color processing program storage medium of the present invention.

Figure 5:
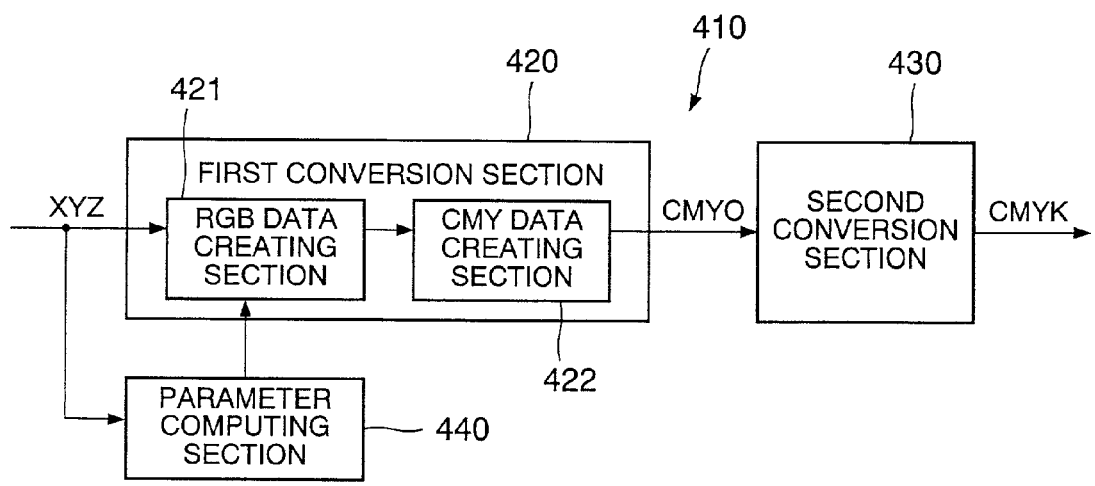
FIG. 5 is a functional block diagram of an embodiment of a color processing apparatus according to the present invention.

FIG. 5 is a functional block diagram of an embodiment of a color processing apparatus according to the present invention.

A color processing apparatus 410 shown in FIG. 5 is implemented when the color processing program 310 shown in FIG. 4 is loaded onto the personal computer 20 and is executed by the personal computer 20.

The color processing apparatus 410 shown in FIG. 5 comprises a first conversion section 420, a second conversion section 430 and a parameter computing section 440. The first conversion section 420 comprises an RGB data creating section 421 and a CMY data creating section 422.

The first conversion section 420, which comprises the RGB data creating section 421 and the CMY data creating section 422, the second conversion section 430, and the parameter computing section 440 in the color processing apparatus 410 shown in FIG. 5 comprise the combinations of the first conversion section 320, which comprises the RGB data creating section 321 and the CMY data creating section 322, the second conversion section 330, and the parameter computing section 340, which are shown in FIG. 4 as software parts, with the hardware of the personal computer 20 and the operating systems (OS), respectively.

Figure 6:
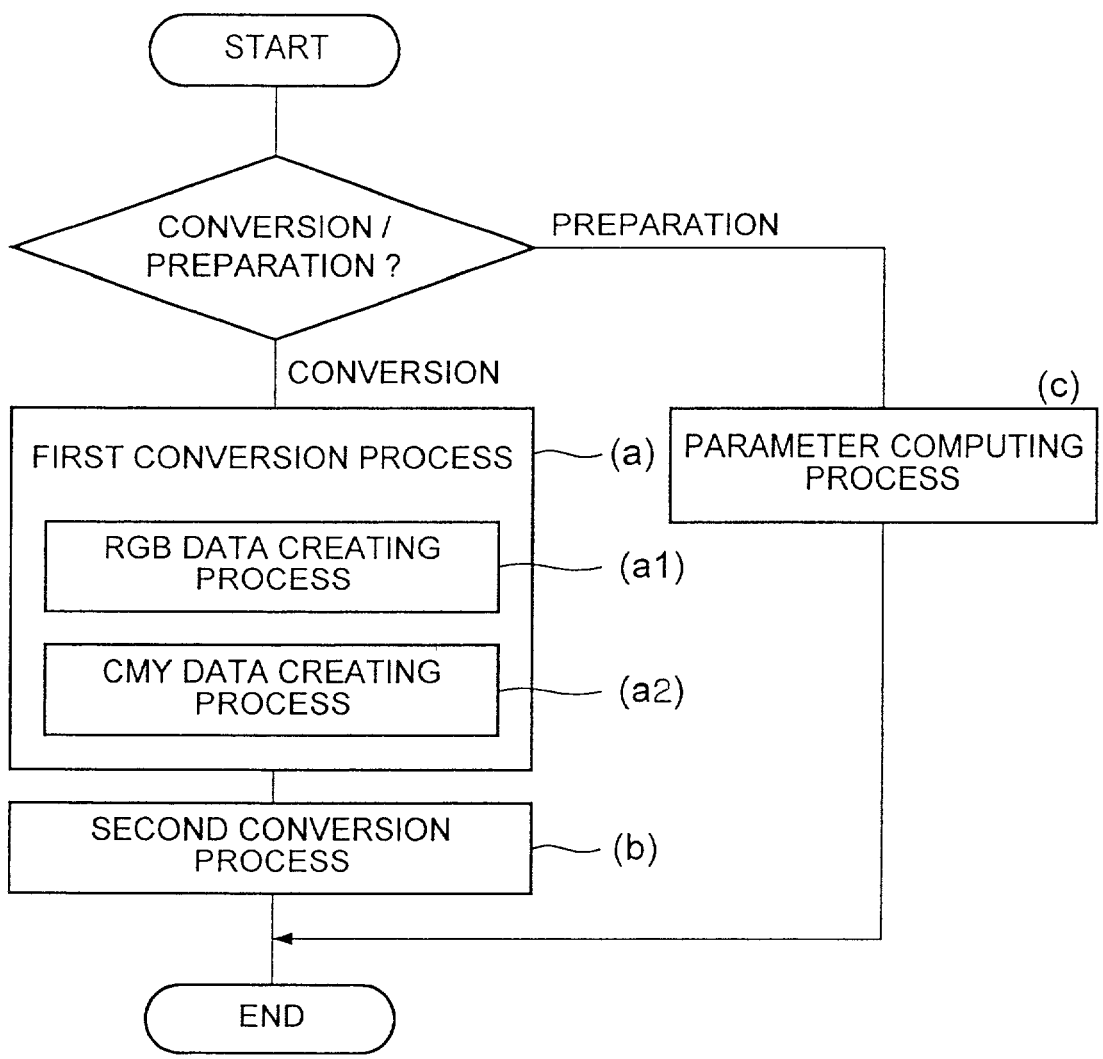
FIG. 6 is a flowchart useful for understanding an embodiment of a color processing method of the present invention.

FIG. 6 is a flowchart useful for understanding an embodiment of a color processing method of the present invention.

In the explanation of the flowchart of FIG. 6, there will be explained the color processing program shown in FIG. 4 and the color processing apparatus shown in FIG. 5.

In the flowchart of FIG. 6, there are shown a first conversion process (step (a)) which is executed when the color conversion processing is carried out, a second conversion process (step (b)), and a parameter computing process (step (c)) which is a preparatory process before the color conversion processing is carried out. The first conversion process (step (a)) comprises an RGB data creating process (step (a1)) and a CMY data creating process (step (a2)).

In the RGB data creating process (step (a1)) of the first conversion process (step (a)), XYZ values represented by the colorimetric image data produced by the image-input device 10 are converted into RGB values in accordance with formula (1) as set forth below.

Incidentally, as typical examples of a color system representative of colorimetry values, there are, for example, L*a*b* and the like other than XYZ. However, they can be converted into XYZ, and thus here it will be explained assuming that XYZ are dealt with.

$$\begin{bmatrix} R \\ G \\ B \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} X \\ Y \\ Z \end{bmatrix} \quad (1)$$

Here, elements $A_{ij}$ (i, j=1, 2, 3) of the matrix $(A_{ij})$ is determined in the parameter computing process (step (c)), and thus, first, the parameter computing process (step (c)) will be explained hereinafter.

Figure 7:
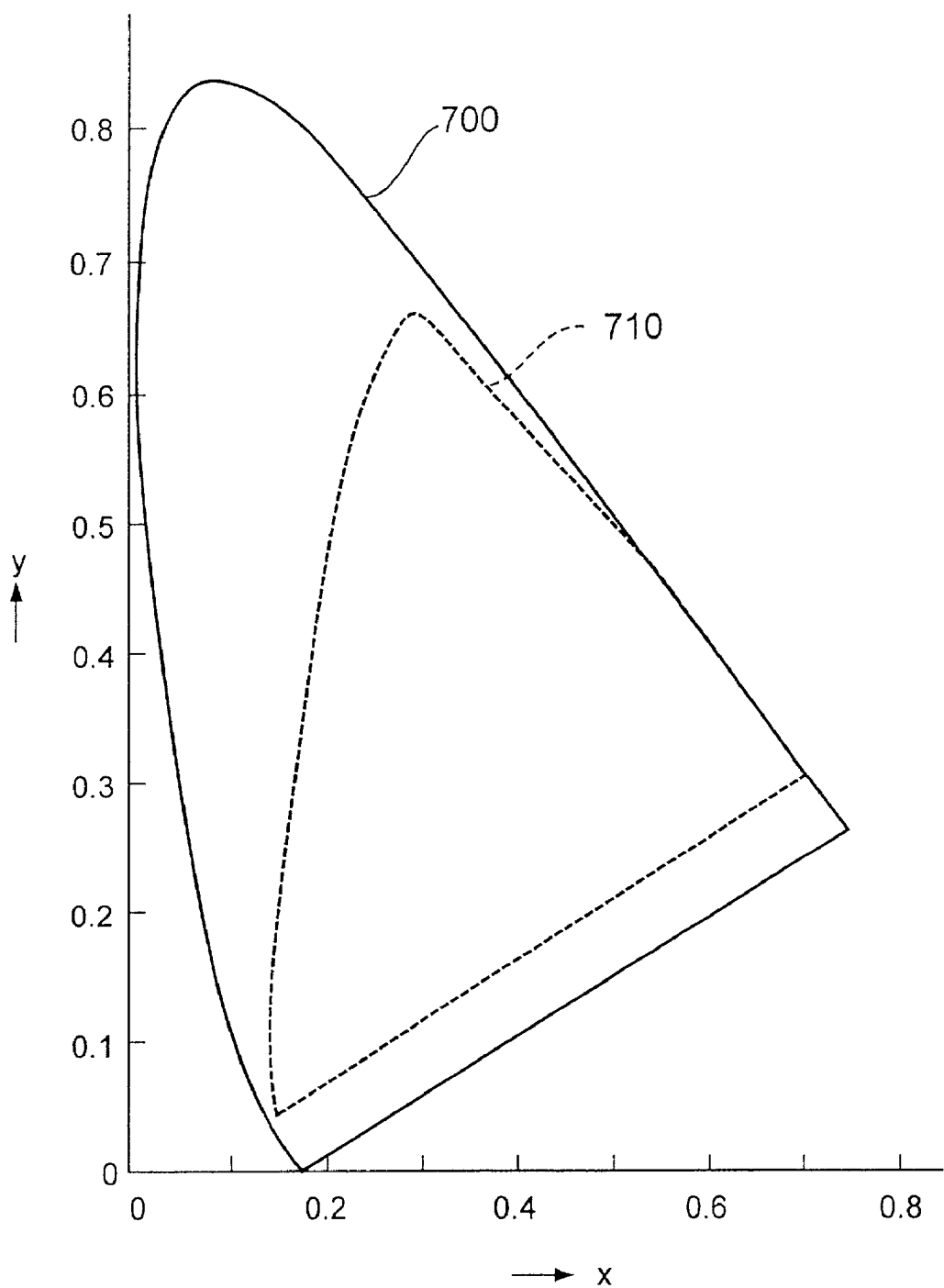
FIG. 7 is a view showing x-y chromaticity view.
Figure 8:
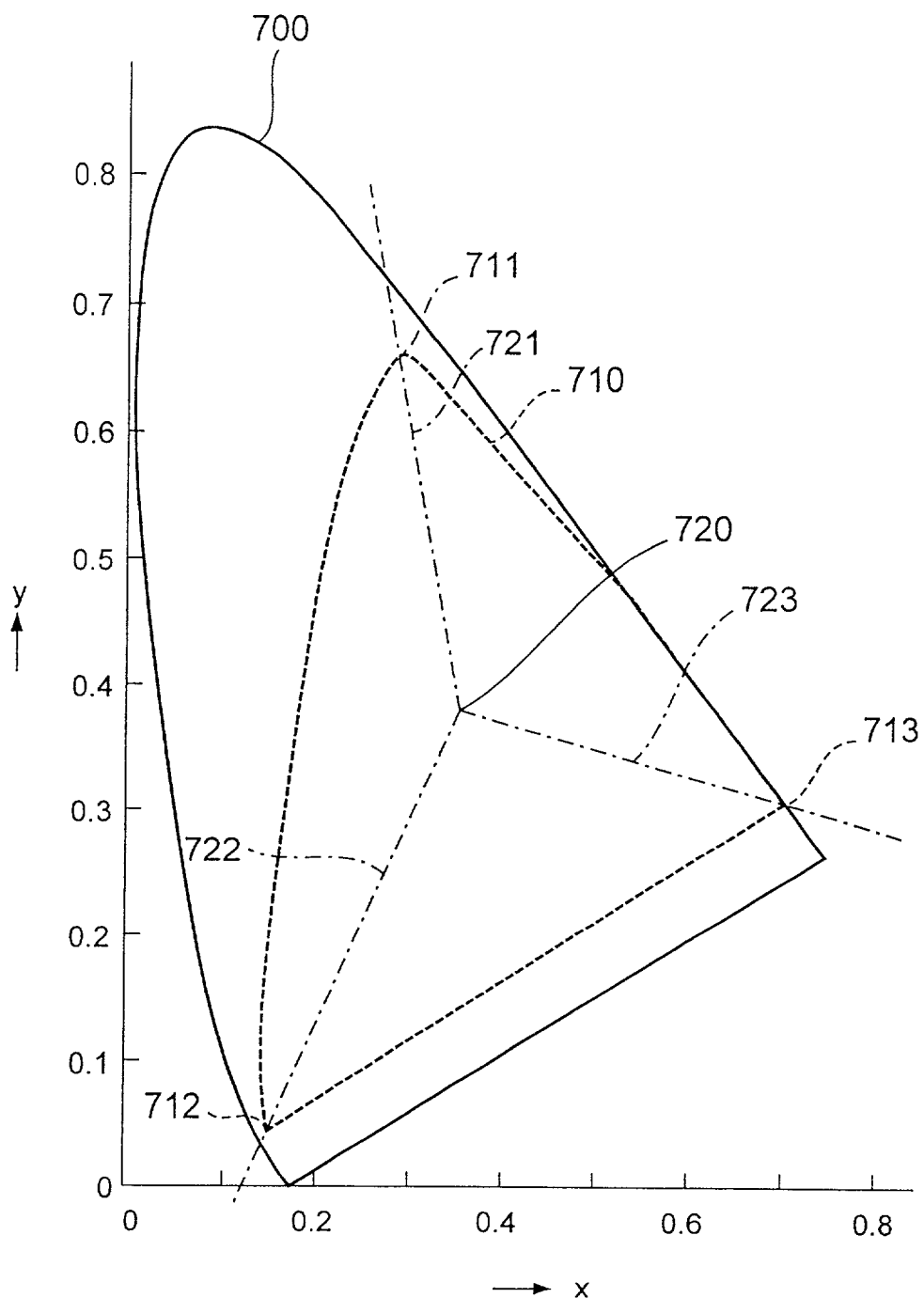
FIG. 8 is a view showing x-y chromaticity view.
Figure 9:
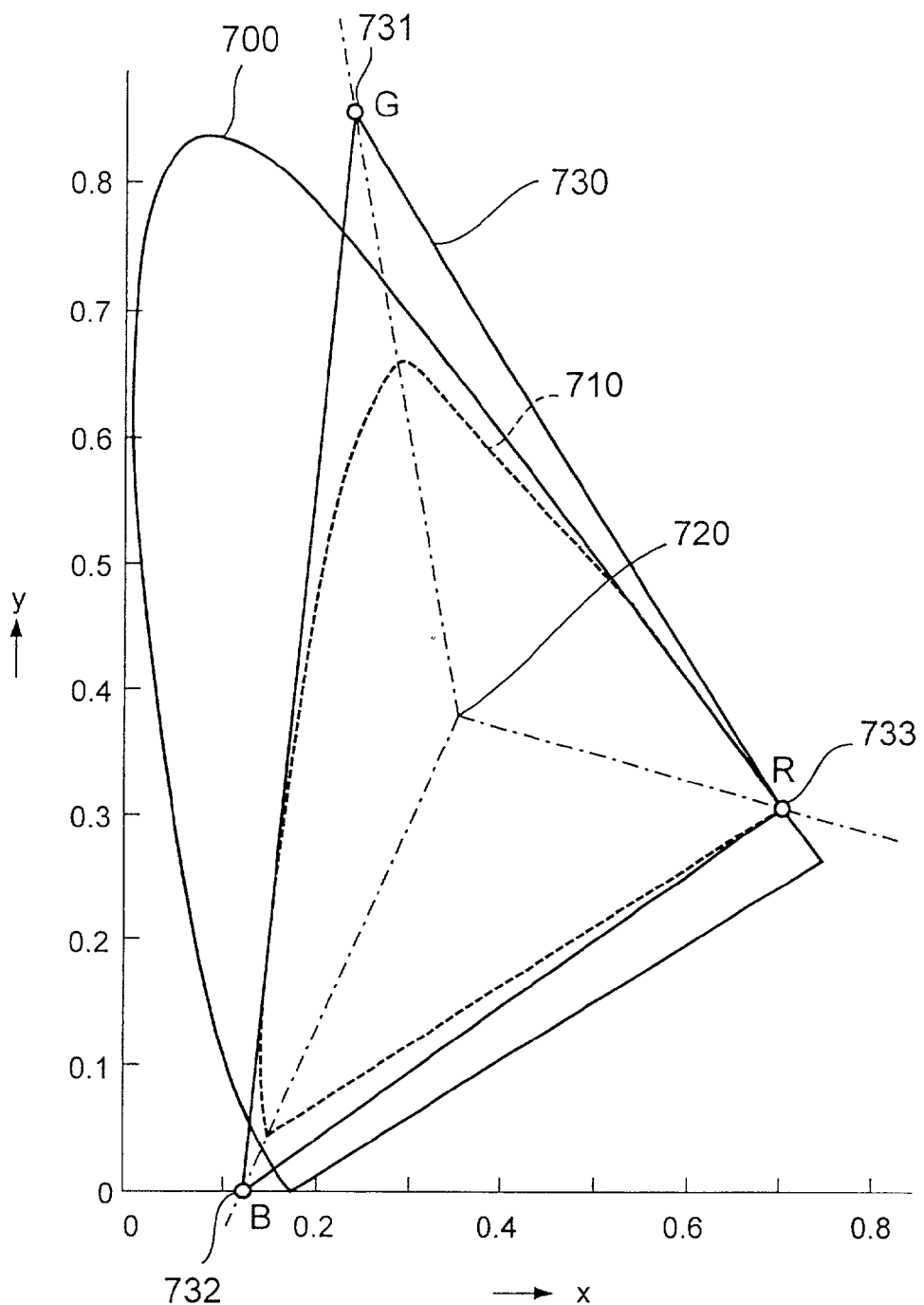
FIG. 9 is a view showing x-y chromaticity view.

Each of FIGS. 7 to 9 is a view showing x-y chromaticity view.

In FIG. 7, there is shown a color reproduction area 710 in an entire color area 700 surrounding the whole area of the existing colors. The color reproduction area 710 is an area in which a color chart consisting of a large number (for example, 729 colors) of color patches, which is the maximum capable of being represented as color on a reversal film having the same characteristic as a reversal film on which the original image 11 (cf. FIG. 1) is recorded, is created, and a large number (for example, 729 colors) of points on the x-y chromaticity view, which are determined from colorimetry data for XYZ obtained through reading by the image-input device 10, is encircled.

A relationship between the colorimetry data for XYZ and coordinate points (x, y) on the x-y chromaticity view is as follows.

$$x=X/(X+Y+Z)$$

$$y=Y/(X+Y+Z) \quad (2)$$

A z chromaticity value is expressed by the following formula (3).

$$z=1-x-y=Z/(X+Y+Z) \quad (3)$$

While the z chromaticity value is not necessary for a notation of the x-y chromaticity view of FIGS. 7 to 10, it is necessary for the latter computation.

Next, as shown in FIG. 8, a predetermined white point is determined on the x-y chromaticity view. According to the present embodiment, the following point $(x_w, y_w)$, which represents the chromaticity value of light $D_{50}$ of the auxiliary standard of CIE, is defined as a white point 720.

$$(x_w, y_w)=(0.3457, 0.3586) \quad (4)$$

Next, let us consider on the x-y chromaticity view three straight lines 721, 722 and 723, which couple the white point 720 with the coordinate points 711, 712 and 713 (vertexes of roughly triangle of the color reproduction area 710) corresponding to the primary color of the color reproduction area 710, respectively, and in addition, as shown in FIG. 9, a triangle 730 having its vertexes on the three straight lines and including the color reproduction area 710. It is desirable for the triangle 730 that it is set up in such a manner that the triangle 730 includes the color reproduction area 710 and the area is minimum.

According to the present embodiment, the vertexes of the triangle 730 thus set up are denoted in form of primary color points 731, 732 and 733, which are representative of chromaticity values of primary colors of G, B and R, respectively.

From the white point 720 and the three primary color points 731, 732 and 733 thus determined, elements $A_{ij}$ of the matrix $(A_{ij})$ of the transformation formula shown in the formula (1) are determined as follows (cf. "Foundations of Color Engineering" by Mituo Ikeda, pages 125 to 130, (Kabushiki Kaisha) Asakura Bookstore).

Here, x y z chromaticity values (x, y, z) of the white point 720 are represented by $(x_w, y_w, z_w)$. x y z chromaticity values of the primary color points 731, 732 and 733 are represented by $(x_G, y_G, z_G)$, $(x_B, y_B, z_B)$, $(x_R, y_R, z_R)$, respectively.

Formula (1) is expressed by $$R=A_{11}X+A_{12}Y+A_{13}Z$$

$$G=A_{21}X+A_{22}Y+A_{23}Z$$

$$B=A_{31}X+A_{32}Y+A_{33}Z \quad (5)$$

(a) with respect to the white point $(x_w, y_w, z_w)$, $$A_{11}x_w + A_{12}y_w + A_{13}z_w = 1$$

$$A_{21}x_w + A_{22}y_w + A_{23}z_w = 1$$

$$A_{31}x_w + A_{32}y_w + A_{33}z_w = 1 \quad (6)$$

(b) with respect to primary color point $(x_G, y_G, z_G)$ of G, $$A_{11}x_G + A_{12}y_G + A_{13}z_G = 0$$

$$A_{31}x_G + A_{32}y_G + A_{33}z_G = 0 \quad (7)$$

(c) with respect to primary color point $(x_B, y_B, z_B)$ of B, $$A_{11}x_B + A_{12}y_B + A_{13}z_B = 0$$

$$A_{21}x_B + A_{22}y_B + A_{23}z_B = 0 \quad (8)$$

(d) with respect to primary color point $(x_R, y_R, z_R)$ of R, $$A_{21}x_R + A_{22}y_R + A_{23}z_R = 0$$

$$A_{31}x_R + A_{32}y_R + A_{33}z_R = 0 \quad (9)$$

Taking notice of formulas including for example, $A_{11}$, $A_{12}$, $A_{13}$ in the expression (6) to (9), the following three formulas exist.

$$A_{11}x_w + A_{12}y_w + A_{13}z_w = 1$$

$$A_{11}x_G + A_{12}y_G + A_{13}z_G = 0$$

$$A_{11}x_B + A_{12}y_B + A_{13}z_B = 0$$

Solving those three simultaneous equations makes it possible to determine $A_{11}$, $A_{12}$, $A_{13}$. Likewise, there exist three formulas including $A_{21}$, $A_{22}$, $A_{23}$, too, and there exist three formulas including $A_{31}$, $A_{32}$, $A_{33}$, too. Solving those simultaneous equations makes it possible to determine all elements $A_{ij}$ (i, j=1, 2, 3) of the matrix $(A_{ij})$ of the formula (1). In the present embodiment, those elements $A_{ij}$ correspond to the parameter referred to in the present invention.

In the present embodiment as mentioned above, the white point and the primary color point are rather strictly determined. However, it is acceptable that those points are empirically determined in some extend, without passing through such a strict step, and the elements of the matrix of the formula (1) are determined in accordance with coordinates of those points. In this case, however, as compared with a case where those points are strictly determined as mentioned above in accordance with the present embodiment, there is a possibility that an accuracy of the final color processing is lowered, or an operator is obliged to have a load in order to avoid such a matter that an accuracy of the final color processing is lowered.

In the parameter computing process of the step (c) of FIG. 6, in the manner as mentioned above, parameters (in the example as mentioned above the elements $A_{ij}$ of the matrix $(A_{ij})$ of the formula (1)) are computed. The parameters thus computed are saved for the purpose of color conversion processing for the actual image (the original image 11 shown in FIG. 1).

In the color processing program 310 shown in FIG. 4 and the color processing apparatus 410 shown in FIG. 5, the parameter computing section 340 and the parameter computing section 440 serve to perform processing of the parameter computing process of the step (c) of FIG. 6, respectively.

Next, there will be described color conversion processing for the actual image. When the image-input device 10 (cf. FIG. 1) is used to read the original image 11 recorded on a color reversal film, colorimetry data (XYZ values) on the respective points of the original image are obtained.

The colorimetry data (XYZ values) are converted into RGB data in accordance with the formula (1) in the RGB data creating process (step (a1)) of the first conversion process (step (a)) shown in FIG. 6, and then in the CMY data creating process (step (a2)) of the first conversion process (step (a)), CMY data are determined from RGB data determined in the RGB data creating process (step (a1)) in accordance with the following formula (10).

$$C = -1 \, o \, g \, R$$

$$M = -1 \, o \, g \, G$$

$$Y = -1 \, o \, g \, B \quad (10)$$

In the color processing program 310 shown in FIG. 4 and the color processing apparatus 410 shown in FIG. 5, the RGB data creating section 321 of the first conversion section 320 and the RGB data creating section 421 of the first conversion section 420 serve to perform processing of the RGB data creating process (step (a1)) of the first conversion process (step (a)) shown in FIG. 6, respectively. Further, in the color processing program 310 shown in FIG. 4, the CMY data creating section 322 of the first conversion section 320 serves to perform processing of the CMY data creating process (step (a2)) of the first conversion process (step (a)) shown in FIG. 6. And in the color processing apparatus 410 shown in FIG. 5, the CMY data creating section 422 of the first conversion section 420 serves to perform processing of the CMY data creating process (step (a2)) of the first conversion process (step (a)) shown in FIG. 6.

The second conversion process (step (b)) of the flowchart in FIG. 6 is a process of obtaining CMYK data through applying the color conversion processing with great accuracy for each image utilizing skills of an operator.

In the first conversion process (step (a)), the colorimetry data are converted into CMY data in the manner as mentioned above. Consequently, in the second conversion process (step (b)), it is possible to perform the color processing based on the CMY data. Thus, it is possible to perform the color conversion processing with great accuracy using technique familiar to an operator.

In the second conversion section 330 constituting the color processing program shown in FIG. 4 and the second conversion section 430 constituting the color processing apparatus shown in FIG. 5, there is constructed an algorithm useful for performing a color conversion from CMY data into CMYK data. An operator controls various sorts of parameters to define the algorithm, so that the color conversion from CMY data into CMYK data is performed in accordance with the parameters after controlled.

The fundamental algorithm of the second conversion section (the second conversion process) is well known.

However, here, applicants introduce an example of the recent algorithms (cf. Japanese Patent Application Serial No. Hei. 11-353006).

Figure 10:
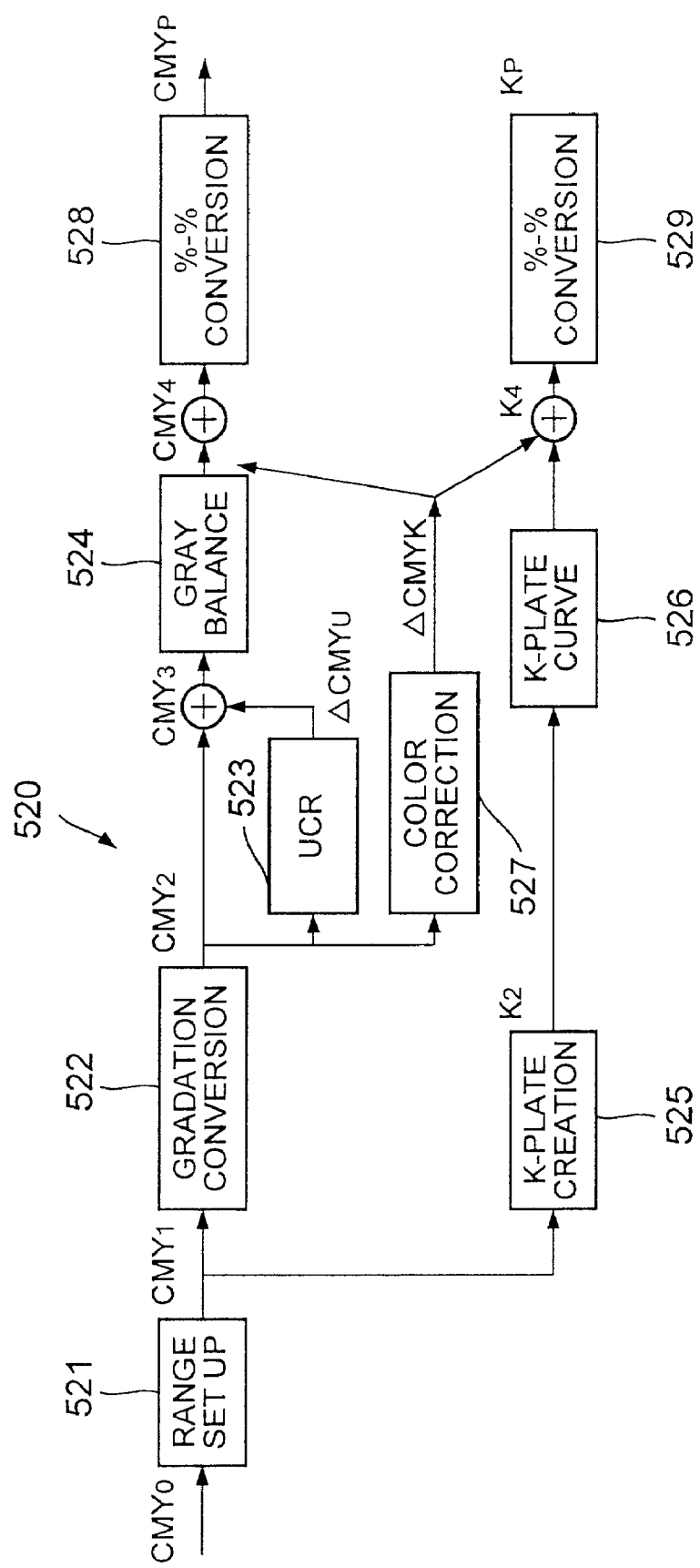
FIG. 10 is a block diagram of a color processing section which is an example of the second conversion section of the color processing apparatus shown in FIG. 5.

FIG. 10 is a block diagram of a color processing section which is an example of the second conversion section 430 of the color processing apparatus 410 shown in FIG. 5. Here, in order to mutually distinguish CMY data, CMY data, which is determined in the first conversion section 420 and is transmitted to the second conversion section 430, is addressed as color data $CMY_0$.

The color data $CMY_0$, which are entered to a color processing section 520, is first fed to a range set up section 521.

The range set up section 521 designates a range width in accordance with a designation value of dye density in the highlight on the original image and a designation value of dye density in the shadow on the original image, applies a normalization according to the range width to the color data $CMY_0$, and outputs the normalized color data $CMY_1$.

The color data $CMY_1$, that is outputted from the range set up section 521, is fed to a gradation conversion section 522 and a K-plate creating section 525.

The gradation conversion section 522 is set up with tone curves for C, M and Y three colors corrected by a correction coefficient of the highlight of the tone curve, a correction coefficient of the shadow, and a correction coefficient of the middle. The gradation conversion section 522 determines color data $CMY_2$ by a gradation conversion of the color data $CMY_1$ using those tone curves.

The color data $CMY_2$ determined by the gradation conversion section 522 is fed to a UCR section 523 for performing a UCR operation to determine gray component values $CMY_U$, which are to be subtracted from the color data $CMY_2$, in accordance with parameter values set up by an operator. The gray component values $CMY_U$ thus determined is subtracted from the color data $CMY_2$ outputted from the gradation conversion section 522, so that color data $CMY_3$ is created.

The color data $CMY_3$, which are subtracted in the gray component, are fed to a gray balance section 524 in which a gray balance of the color data $CMY_3$ is corrected to a gray balance of dot % values based on the color characteristic of the printing ink. Correction of the gray balance of the color data $CMY_3$ makes it possible to convert the color data $CMY_3$ into dot % values of C, M and Y three colors of dot % values of C, M, Y and K four colors.

On the other hand, the K-plate creating section 525, which receives the color data $CMY_1$ outputted from the range set up section 521, determines the minimum value of the dye density value $C_1$, $M_1$ and $Y_1$ represented by the color data $CMY_1$, so that a gray component value $K_a$ of a color represented by the color data $CMY_1$ is determined. And the gray component value $K_a$, which is determined by the K-plate creating section 525, is fed to a K-plate curve section 526 in which a K-plate curve, which represents the percentage of components to be replaced by a K-plate in the gray component as a function of the gray component value $K_a$, is used to convert the gray component value $K_a$ into a dot % value for the K-plate.

The color processing section 520 shown in FIG. 10 is provided with further a color correction section 527 for performing a color correction operation. The color correction section 527 is set up with color correction coefficients for controlling color variations in color directions of R, Y, G, C, B and M for each of divisional plates of C, M, Y and K four colors. The color correction section 527 receives the color data $CMY_2$ determined by the gradation conversion section 522, and determines color correction data $\Delta CMYK$ representative of correction quantity of dot % values for C, M, Y and K four colors, which correspond to color variations according to the color data $CMY_2$ and the color correction coefficient. Of the color correction data $\Delta CMYK$, C, M and Y three colors component is added to the dot % values outputted from the gray balance section 524, so that C, M and Y three colors of dot % values $CMY_4$ are created for reproduction of a color after the color conversion. On the other hand, of the color correction data $\Delta CMYK$, the black component is added to the dot % values for the K-plate outputted from the K-plate curve section 526, so that dot % value $K_4$ for the K-plate is created for reproduction of a color after the color conversion.

The C, M and Y three colors of dot % values $CMY_4$ and the dot % value $K_4$ for the K-plate thus created are fed to %—% conversion sections 528 and 529, respectively, to be subjected to a fine correction for dot % values and be outputted in form of dot % values $CMY_P$ and $K_p$ for printing, respectively.

The dot % values $CMY_P$ and $K_p$ thus outputted are transmitted to the printing system 30 (cf. FIG. 1) in form of printing image data. The printing system 30 creates divisional plates for printing in accordance with the transmitted printing image data and performs a printing, so that a preferable color is reproduced on a printed matter.

The color processing section 520 (the second conversion section 430 shown in FIG. 5) shown in FIG. 10 is set up with a large number of various parameters and performs color conversion processing according to the set up parameter. The set up of the parameters is deeply involved in technique of an operator. The color processing section 520 (the second conversion section 430) are to perform a conversion from the conventional CMY data to the CMYK data. Thus, an operator can perform a great accuracy of color conversion processing making good use of one's experience.

As mentioned above, according to the present invention, colorimetry data are once converted into CMY data, and color processing is performed on the converted CMY data. This feature makes it possible to make good use of one's property for performing a great accuracy of processing accumulated, that is, the former color processing apparatus, technique of color processing and technique of an operator. And thus, it is possible to perform a great accuracy of color processing.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color processing method comprising:
   a first conversion process for converting on a fixed basis colorimetry data representative of colorimetry values into CMY color data representative of a combination of values of C, M and Y; and
   a second conversion process for converting the CMY color data obtained in said first conversion process into color data depending on a device.

2. A color processing method according to claim 1, wherein said first conversion process comprises:
   an RGB data creating process for converting the colorimetry data into RGB data representative of a combination of values of three primary colors R, G and B, and;
   a CMY data creating process for subjecting the values of three primary colors R, G and B represented by the RGB data obtained in said RGB data creating process to a logarithmic transformation to create CMY data representative of a combination of values of C, M and Y.

3. A color processing method according to claim 2, further comprising a parameter computing process for computing parameters of converting the colorimetry data into the RGB data in accordance with a chromaticity value of a predetermined white point on an x-y chromaticity view and chromaticity values of three points associated with three primary colors R, G and B on the x-y chromaticity view, wherein said RGB data creating process converts the colorimetry data into the RGB data in accordance with the parameters computed in said parameter computing process.

4. A color processing method according to claim 3, wherein said parameter computing process provides such a definition that vertexes of a triangle are defined as three points associated with three primary colors R, G and B, said vertexes being located at three straight lines on the x-y chromaticity view, coupling three points, which represent main wave lengths of three primary colors R, G and B in a color reproduction area on the x-y chromaticity view, corresponding to an assembly of entire colors reproducible in a colorimetry system for obtaining the colorimetry data, with a predetermined white point on the x-y chromaticity view, respectively, where said triangle includes the color reproduction area.

5. A color processing method according to claim 1, wherein said second conversion process converts the CMY color data obtained in said first conversion process into CMYK data representative of a combination of values of C, M, Y and K.

6. A color processing method according to claim 1, wherein the first conversion process comprises defining a white point and vertices extended from the white point to form a triangle, said triangle enclosing a reproduction range of the device and the vertices corresponding respectively to primary colors in an x-y chromaticity view.

7. The method of claim 6, wherein the vertices of the triangle correspond to main wavelengths in the x-y chromaticity view.

8. The method of claim 7, wherein the main wavelengths correspond to three primary colors R, G, and B.

9. A color processing apparatus comprising:
a first conversion section for converting on a fixed basis colorimetry data representative of colorimetry values into CMY data representative of a combination of values of C, M and Y; and
a second conversion section for converting the CMY color data obtained in said first conversion section into color data depending on a device.

10. A color processing program storage medium storing a color processing program which causes a computer to operate as a color processing apparatus, when the color processing program is executed in the computer system, wherein said color processing program storage medium stores the color processing program comprising:
a first conversion section for converting on a fixed basis colorimetry data representative of colorimetry values into CMY data representative of a combination of values of C, M and Y; and
a second conversion section for converting the CMY color data obtained in said first conversion section into color data depending on a device.

* * * * *